July 30, 1963 W. H. PRICE 3,099,123
ROTARY LAWN MOWER HINGED GRASS CATCHING CHUTE
Filed April 17, 1961
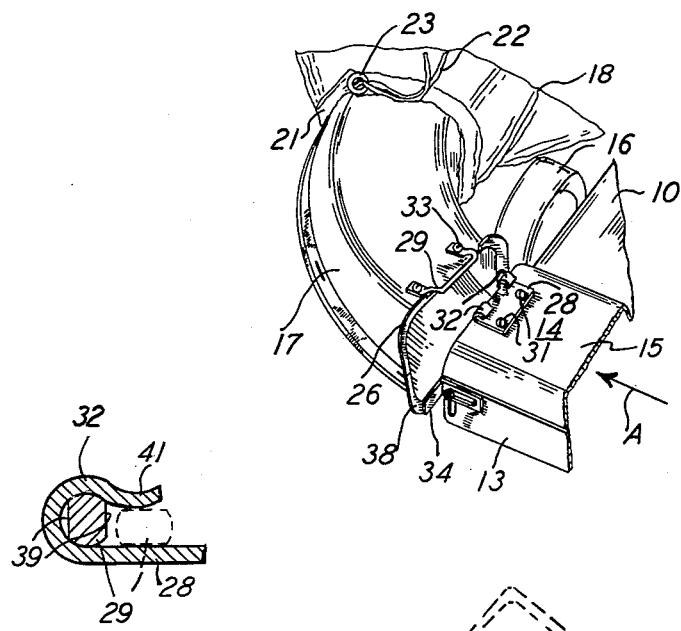
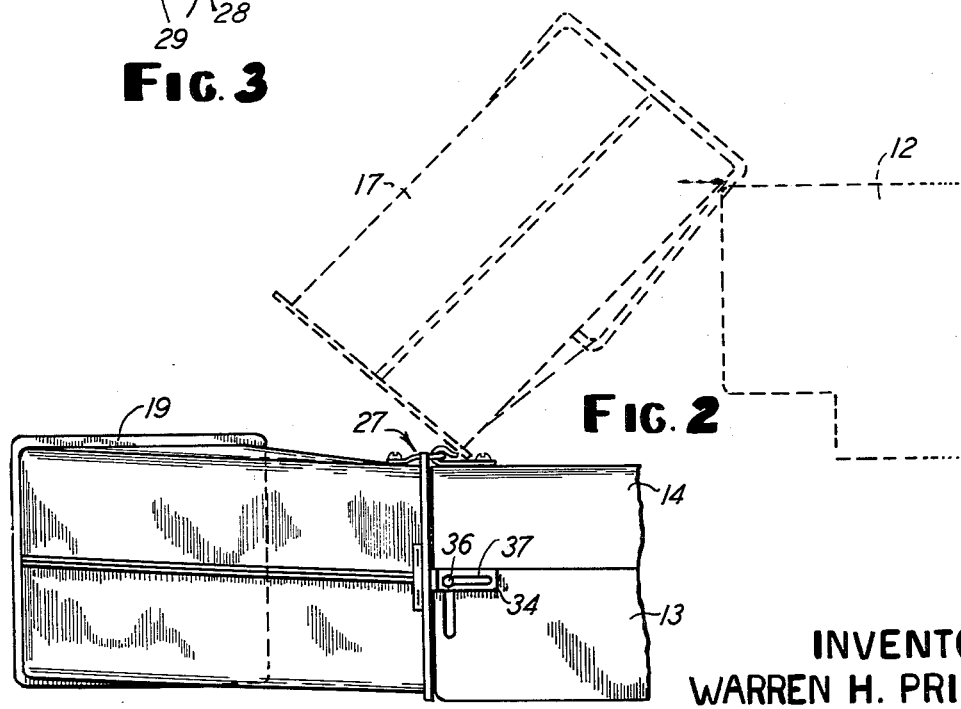
INVENTOR:
WARREN H. PRICE
BY: *Arthur J. Hansmann*
ATTORNEY 3,099,123
ROTARY LAWN MOWER HINGED GRASS
CATCHING CHUTE
Warren H. Price, South Milwaukee, Wis., assignor to Jacobsen Manufacturing Co., Racine, Wis., a corporation of Wisconsin
Filed Apr. 17, 1961, Ser. No. 103,402
1 Claim. (Cl. 56—202)

This invention relates to a rotary lawn mower, and more particularly, it relates to a grass-catching bag and chute attached to the lawn mower to be a part thereof.

Rotary lawn mowers are known to include a housing and an engine and a rotor disposed within the housing and driven by the engine such that the grass clippings and air can be impelled from the housing through a spout or outlet opening provided in the housing. The outlet opening is conventionally provided at the side of the mower with respect to the fore-and-aft axis of the mower, and this is for several reasons including safety to the operator who is positioned behind the mower and will therefore not be struck by any objects thrown by the rotor of the discharge spout and because the grass will be thrown to the side of the lawn which is already mowed if no catcher is used on the mower. However, when it is desired to use a catcher on this type of rotary mower with a side discharge spout, the catcher must necessarily project laterally of the mower and it therefore is obstructing the movement of the mower past trees, shrubs, buildings and the like unless adequate clearance is of course provided in the steering of the mower past these fixed objects. Also, the gass catchers occasionally become clogged when damp clippings are blown into the catchers, as the clippings tend to cling to the side walls of the catchers or the chutes in registry with the mower outlet opening.

It is a general object of this invention to provide a lawn mower with a bag type of catcher and chute which overcomes the problems heretofore encountered in the art.

A more specific object of this invention is to provide a bag type of catcher for use on a rotary lawn mower, wherein the catcher can be readily attached to the lawn mower and detached therefrom, and also wherein the catcher can be readily disposed in an inoperative position, so that it will not project laterally of the mower and impede the normal movement of the mower past objects such as those mentioned above, and the chute can bounce over obstructions therebelow.

Still another object of this invention is to provide a chute and bag type grass catcher wherein the chute can be readily cleared of clippings which may be clinging thereto, and wherein the clearing action can be completed without any danger to the operator.

A further object of this invention is to provide a bag type of grass catcher which can be used on several different sizes of rotary lawn mowers without requiring different sizes of catcher or chute. In also accomplishing this particular object, the bag catcher and its chute do not require any permanent attachment of the chute to the mower housing and thus the expense of the chute, the time, effort, and skill required in attaching and detaching the chute, are a minimum, and the efficiency of the chute is of a maximum amount as it has at least a uniform cross-sectionl area from front to rear.

Other objects and advantages will become apparent upon reading the following description in light of the accompanying drawings wherein:

FIG. 1 is a front perspective view of a fragment of a rotary type lawn mower and showing a preferred embodiment of this invention.

FIG. 2 is an enlarged front elevational view of the fragment shown in FIG. 1 with the bag removed therefrom and with the dotted portion showing a raised or second position for the chute.

FIG. 3 is an enlarged sectional view through the hinge.

The same reference numerals refer to the same parts throughout the several views.

FIG. 1 shows a rotary type lawn mower having a housing 10 and an engine 12 is indicated in FIG. 2 mounted on the top of the housing 10. The housing 10 has a front plate 13 secured thereto and it also has a lateral or side spout 14 extending from the housing direct to one side thereof, and the chute has a horizontal top 15 and in this instance it extends forwardly of the mower wheel 16. The mower is thus of a conventional type and need not be further shown to provide a full disclosure for one skilled in the art.

The grass catcher consists of the tubular and curved chute 17 and the bag 18 is attached to the chute and is supported in any conventional manner to mower, preferably by attaching between the unshown lawn mower handle and the rear end of the bag 18. At this time it might also be noted that the rearwardly disposed and directed end 19 of the chute 17 is flanged to receive the front end 21 of the bag 18 and a rope 22 secures the bag end 21 over the flange 19 and on the chute 17 as the rope can be pulled tight thereon by means of the tightening button or slip ring 23 which the rope passes through after of course extending around the front end 21 of the grass catcher bag. The bag 18 is therefore of a pliable material suitable for this purpose. It is thus of course to be understood that the chute 17 is of a hollow interior and it extends between the front or grass clipping inlet end 26 and the outlet end 19 which leads into the bag 18. It will of course be further understood that the mower operates in a manner to cause its rotor (not shown) to rotate in a direction to create an airflow and a grass clipping discharge in the direction of the arrow designated "A" in FIG. 1, and thus cause the discharge to be directed through the spout 14 and into the chute 17 and ultimately into the bag 18 where the clippings are of course accumulated.

The particular feature of this invention is the provision of the hinge generally designated 27 and being mounted in one part 28 thereof on the mower housing or spout 14 and in another part designated 29 to be mounted on the inlet end 26 of the chute 17. Thus, screws or the like 31 are shown to connect the hinge portion 28 to the spout 14, and the hinge portion 28 is shown to have hooks or pivot supports 32, which provide a socket, included in the piece 28 to of course have the axis of this portion of the hinge disposed in the fore-and-aft direction of the mower and slightly above the top of the spout 14. To mate with the hooks 32, the hinge portion 29 has screws or the like 33 attaching the hinge pin or portion 29 to the spout 17 such that the two portions 28 and 29 of course are pivotally or hingedly attached together to thus permit the spout 17 to be both supported in the lowered dotted line position shown in FIG. 2 and to be supported in the raised dotted line position shown in FIG. 3. The hinge pin 29 and the hooks 32 thus provide a hinge pin and socket combination.

At this time it will also be noted that the front of the mower housing 10 has an abutment or angle 34 adjustably secured thereto through a bolt 36 such that the angle 34 can be moved laterally through its slot 37 to project a selected lateral distance with respect to the mower housing 10 and thus abut the front flange 38 of the chute 17 to support the latter in a cantilever manner on the housing 10. This particular support arrangement of course permits the one side of chute 17 to be adapted and to fit different sizes of mowers with varying spouts 14.

It will thus be appreciated that a simple but universal type of attachment and mounting is provided for the chute 17 with respect to the mower 10, and also the chute 17 can be placed in the raised and inoperative position shown by the dotted lines in FIG. 2, and this latter position is of importance in the present invention. That is, when the chute 17 is in the dotted position, the mower can be operated considerably closer to fixed objects on the terrain than it can otherwise be operated when the chute 17 is in the lowered position. However, a second or additional important advantage in raising the chute 17 is that it can then be cleared of its clippings which may cling to the interior thereof and in so clearing it, the operator does not endanger his hands by inserting them into the chute 17 with the latter in the raised position as compared to doing so when the chute 17 is in a lowered position and the mower is of course operating. Of course still another advantage of the particular attachment or hinge 27 is that it can be readily made in that the chute 17 can be simply and easily hooked or attached to the housing 10 by the hinge 27 as described. Also, when the chute 17 is in the raised position, it is over-center with respect to the hinge, so it can be retained in that position by leaning against or being in abutment with the engine 12 and the operator can then either transport or use the mower without having the chute in its laterally extended position if he so desires. Further, since the chute end 19 is at least as close to the rear of the bag 18 when the chute is in the raised position, the bag 18 need not be detached from the chute for raising the latter.

FIG. 3 shows the hinge pin 29 to include two flats 39 along the length thereof past the sockets 32. Thus, in the solid position shown, the chute 17 is down, as in FIG. 2, while in the dotted position, the chute 17 is raised for detaching from the sockets 32 by sliding therefrom. This renders the hinge secure in the operating position, and it results in the hinge 29 being detachable only in a positive maneuver and not inadvertently. The hook end 41 provides a space with the body portion 28 for the pin 29 to snugly pass therethrough.

Further, any rise in the terrain, or any obstruction below the chute, will be easily negotiated by the ability of the chute to bounce over the terrain or obstruction as the chute pivots about the hinge 27.

Also, the chute 17 is of a uniform cross-sectional area from the inlet end 26 to the outlet end 27, and the chute efficiency is therefore a maximum as there is no restriction in the flow therethrough as there would be if the chute were reduced in size toward the outlet end.

While a specific embodiment of this invention has been shown and described, it should be obvious that certain changes could be made in the embodiment and the invention should therefore be limited only by the scope of the appended claim.

What is claimed is:

A grass-catcher chute and bag for attachment to a rotary lawn mower which includes a discharge spout extending laterally of the mower housing, comprising a tubular chute having an inlet end attachable to said spout and in flow registry therewith and having an outlet end disposed axially angled with respect to said inlet end to be directed rearwardly with respect to said mower, a hinge interconnected between said chute at said inlet end thereof and said housing for pivotally attaching said chute to said housing for swinging said chute from a position of registry with said spout to a position out of registry, said hinge being of a hinge pin and hook combination with the cross-sectional dimension of said hinge pin being of a reduced selected dimension in one direction and with said hook having a space therethrough for receiving only said reduced selected dimension for selective removal of said pin from said hook and with said space being smaller than the remaining cross-sectional dimension of said pin for restraining removal of said pin from said hook, and a grass-catcher bag attached at one end to said outlet end of said chute and being in flow registry therewith and said bag being attachable at the other end thereof to said mower.

References Cited in the file of this patent

UNITED STATES PATENTS

| | | |
|---|---|---|
| 2,777,271 | Sutton | Jan. 15, 1957 |
| 2,794,208 | Scroggins | June 4, 1957 |
| 2,882,668 | Murillo | Apr. 21, 1959 |
| 2,973,614 | Horner et al. | Mar. 7, 1961 |
| 3,008,284 | Bright | Nov. 14, 1961 |